United States Patent
Wu

(10) Patent No.: US 10,809,532 B2
(45) Date of Patent: Oct. 20, 2020

(54) DISPLAY METHOD AND DISPLAY SYSTEM

(71) Applicant: Lenovo (Beijing) Co., Ltd., Beijing (CN)

(72) Inventor: Peng Wu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/238,426

(22) Filed: Jan. 2, 2019

(65) Prior Publication Data

US 2019/0204604 A1 Jul. 4, 2019

(30) Foreign Application Priority Data

Jan. 2, 2018 (CN) .......................... 2018 1 0001166

(51) Int. Cl.
  *G09G 5/00* (2006.01)
  *G02B 27/01* (2006.01)
  *G06F 3/01* (2006.01)

(52) U.S. Cl.
  CPC ....... *G02B 27/0172* (2013.01); *G02B 27/017* (2013.01); *G06F 3/011* (2013.01); *G02B 2027/014* (2013.01); *G02B 2027/0138* (2013.01)

(58) Field of Classification Search
  USPC ................ 345/8, 9, 633, 619, 621, 663, 656
  See application file for complete search history.

(56) References Cited

U.S. PATENT DOCUMENTS

| | | | |
|---|---|---|---|
| 2016/0189426 A1* | 6/2016 | Thomas | G06T 19/006 345/633 |
| 2017/0243406 A1* | 8/2017 | Yamazaki | G09G 3/002 345/8 |
| 2018/0114353 A1* | 4/2018 | Champion | G06T 15/005 345/619 |
| 2018/0180887 A1* | 6/2018 | Kim | G02B 5/30 345/8 |
| 2018/0247402 A1* | 8/2018 | Xie | G06T 19/006 345/621 |

(Continued)

FOREIGN PATENT DOCUMENTS

| | | |
|---|---|---|
| CN | 103248830 A | 8/2013 |
| CN | 103337079 A | 10/2013 |

(Continued)

*Primary Examiner* — Thuy N Pardo
(74) *Attorney, Agent, or Firm* — Anova Law Group, PLLC

(57) ABSTRACT

Display method and display system are provided. The method includes acquiring a collection of first images by a first time-interval using a first process, performed by a plurality of acquisition devices acquiring surroundings thereof acquiring one or more second images using a second process different from the first process; processing each first image in the collection of the first images and the one or more second images using a predetermined process to form a collection of third images; and displaying the collection of the third images by a second time-interval. The predetermined process includes identifying overlapping areas between the first images and the second images and identifying a display priority relationship among the overlapping areas. The third images include a first area, the first area is at least a portion of the overlapping areas, and the first area displays at least a portion of the first images.

14 Claims, 7 Drawing Sheets

(56) References Cited

U.S. PATENT DOCUMENTS

| | | | | |
|---|---|---|---|---|
| 2019/0139309 A1* | 5/2019 | Lo | ........................ | G06F 3/03547 |
| | | | | 345/633 |
| 2019/0180517 A1* | 6/2019 | Yamazaki | .............. | G09G 3/002 |
| | | | | 345/656 |
| 2019/0302878 A9* | 10/2019 | Choi | ................ | G06K 19/06037 |
| | | | | 345/9 |
| 2019/0310481 A1* | 10/2019 | Blum | ...................... | G06T 11/00 |
| | | | | 345/663 |

FOREIGN PATENT DOCUMENTS

| | | |
|---|---|---|
| CN | 103474009 A | 12/2013 |
| CN | 104021590 A | 9/2014 |
| CN | 104660872 A | 5/2015 |
| CN | 104798109 A | 7/2015 |
| CN | 104836938 A | 8/2015 |

\* cited by examiner

DISPLAY METHOD AND DISPLAY SYSTEM

CROSS-REFERENCES TO RELATED APPLICATIONS

This application claims the priority to Chinese Patent Application No. 201810001166.3, entitled "Display Method and Display System," filed on Jan. 2, 2018, the entire content of which is incorporated herein by reference.

FIELD OF TECHNOLOGY

The present disclosure relates to the field of virtual reality technology and, more specifically, to a display method and a display system.

BACKGROUND

As a new type of user experience enhancement device, intelligent devices such as virtual reality (VR) devices, augmented reality (AR) devices, and mix reality (MR) devices have been developed. In particular, AR devices and MR devices are becoming more popular as they allow combination of the virtual world with the real world. On the other hand, VR devices are losing popularity because they only place users in a three-dimensional virtual space, and do not allow users to interact with the real world.

Currently, when an AR or MR device combines the virtual world with the real world, the scenes in the virtual world will block the scenes in the real world, giving users the unreal sensation. Therefore, it is desirable to provide solutions for better combination of the virtue world with the real word.

BRIEF SUMMARY OF THE DISCLOSURE

One aspect of the present disclosure provides a display method, including: acquiring a collection of first images by a first time-interval using a first process, the first process being performed by a plurality of acquisition devices acquiring surroundings thereof acquiring one or more second images using a second process, the second process being different from the first process; processing each first image in the collection of the first images and the one or more second images using a predetermined process to form a collection of third images, the predetermined process including: identifying a plurality of overlapping areas between the first images and the second images, and identifying a display priority relationship among the plurality of overlapping areas; and displaying the collection of the third images by a second time-interval. The third images include a first area, the first area is at least a portion of the overlapping areas, and the first area displays at least a portion of the first images.

Another aspect of the present disclosure provides a display system, including: a plurality of acquisition devices, for acquiring a collection of first images of surroundings thereof using a first process by a first time-interval; a processing device, for acquiring one or more second images using a second process, and processing each first image in the collection of the first images and the one or more second images using a predetermined process to form a collection of third images, the second process being different from the first process, the predetermined process including identifying a plurality of overlapping areas between the first images and the second images, and identifying a display priority relationship among the plurality of overlapping areas; and a display device, for displaying the collection of the third images by a second time-interval. The third images include a first area, the first area is at least a portion of the overlapping areas, and the first area displays at least a portion of the first images.

Other aspects of the present disclosure can be understood by those skilled in the art in light of the description, the claims, and the drawings of the present disclosure.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

FIG. 9a illustrates a second image according to some embodiments of the present disclosure.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

The accompanying drawings illustrating embodiments of the present disclosure along with the summary of disclosure provided above and the detailed description provided below serve to explain the concepts of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

Figure 1:
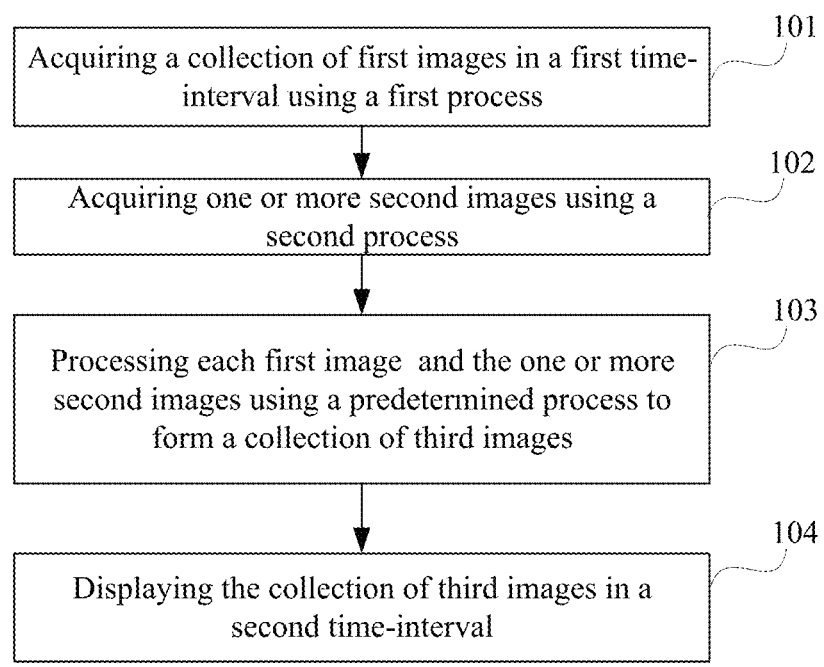
FIG. 1 illustrates a display method according to some embodiments of the present disclosure.

The present disclosure provides a display method as shown in FIG. 1. The method includes the following steps.

In 101, acquiring a collection of first images by a first time-interval using a first process, which may be the process performed by a plurality of acquisition devices for acquiring their surroundings.

The acquisition devices may acquire the collection of first images in the first time-interval, and the first time-interval may correspond to the acquisition frequency of the acquisition devices. More specifically, the acquisition devices may acquire the collection of first images in the first time-interval to form a video file. Since a video file may be made of multiple frames of images, the display method of the present disclosure may process the first images frame by frame, that is, every first image in the collection may be processed.

In one embodiment, the acquisition devices may be cameras or camcorders.

In one embodiment, the first process may be the process of acquiring the surroundings of the acquisition devices that may be within the user's viewing field. For example, the acquisition devices may be place on a head-mounted device near a user's eyes in the same direction as the user's viewing direction, so the acquisition range of the acquisition devices may match the user's viewing field, and a collection of the first images of the surroundings of the acquisition devices within the user's viewing field may be collected.

In 102, acquiring one or more second images using a second process that may be different from the first process.

The second images may be images of a virtual world or a virtual scene, and the second process may be the process of constructing a plurality of second images such as downloading images from the internet, reading images from a storage location, or generating images based on calculation, etc. For example, an image rendering software may be used to generate one or more second images based on a constructed virtual scene.

In 103, processing every first image in the collection of first images and the one or more second images using a predetermined process to form a collection of third images, where the predetermined process may include identifying a plurality of overlapping areas between the first images and the second images, and the display priority relationships of the overlapping areas.

In the present disclosure, every first image in the collection of first images acquired in real-time may be processed to identify a plurality of overlapping areas between the first images and the second images, and the display priority relationships of the overlapping areas. By identifying the overlapping areas and their respective display priority relationships, every first image and the one or more second images may be processed to form the collection of third images. More specifically, the number of third images in the collection of third images may be the same as the number of first images in the collection of first images.

In 104, displaying the collection of third images in a second time-interval, where the third images may include a first area, which may be a portion of the overlapping areas, and the first area may display a portion of the first images. That is, a portion of the overlapping areas may display a portion of the first images, in other words, a portion of the first images may block the second images in the overlapping areas.

In one embodiment, the second time-interval may correspond to the display frequency of the third images in the collection of third images. More specifically, the second time-interval may be the same or different from the first time-interval. For example, the first time-interval and the second time-interval may both be 60 frames per second. In another example, the first time-interval may be 30 frames per second, and the second time-interval may be 60 frames per second; or first time-interval may be 120 frames per second, and the second time-interval may be 60 frames per second.

In one embodiment, two or more acquisition devices may be used separately to acquire the collection of first images in the first time-interval in real-time when acquiring the collection of first images to allow users to see a three-dimensional display. Every first image acquired by different acquisition devices in the collection of first images may be processed with one or more second images to form the collection of third images. Correspondingly, the display position of the collection of third images formed based on the collection of first images acquired by each acquisition device may correspond to the position of the acquisition devices.

Figure 2:
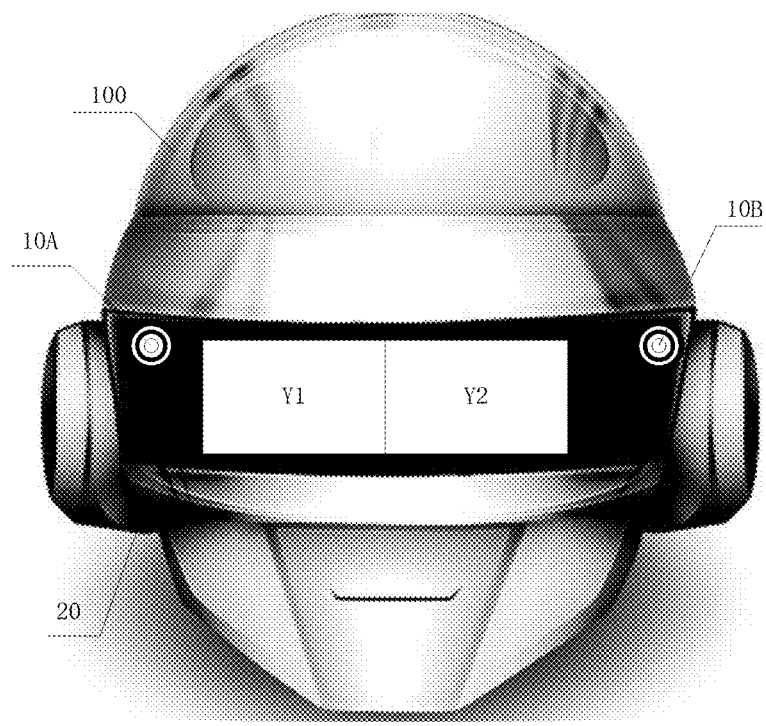
FIG. 2 illustrates a head-mounted device with a plurality of acquisition devices according to the some embodiments of the present disclosure.

In the example of two acquisition devices as shown in FIG. 2, a head-mounted device 100 includes two acquisition devices 10A and 10B, and a display device 20. For ease of description, 10A will be referred to as the first acquisition device, and 10B will be referred to as the second acquisition device. The first acquisition device 10A may be positioned on the head-mounted device near a user's left eye to acquire a collection of first images in the left viewing field, and the second acquisition device 10B may be positioned on the head-mounted device near a user's right eye to acquire a collection of first images in the right viewing field. Assuming images will be processed by a processing device, the processing device may separately process each first image in the collection of first images acquired by the first acquisition device 10A with one or more second images to form a collection of third images, and process each first image in the collection of first images acquired by the second acquisition device 10B with one or more second images to form the collection of third images. Correspondingly, the display position of the collection of third images formed based on the collection of first images acquired by the first acquisition device 10A may be display area Y1 of the display device 20, and the display area Y1 may correspond to the position of the first acquisition device 10A. Further, the display position of the collection of third images formed based on the collection of first images acquired by the second acquisition device 10B may be display area Y2 of the display device 20, and the display area Y2 may correspond to the position of the first acquisition device 10B.

The display method provided in the present disclosure may form the third images by overlaying the images acquired from the first process and the second process. A portion of the first images acquired by the acquisition devices of their surroundings may be the portion of images that may block the images acquired by the second process, such as blocking a portion of the images of the virtual world, so the second images may truly integrate into the real world images to provide a realistic sensation and enhance user experience.

Figure 3:
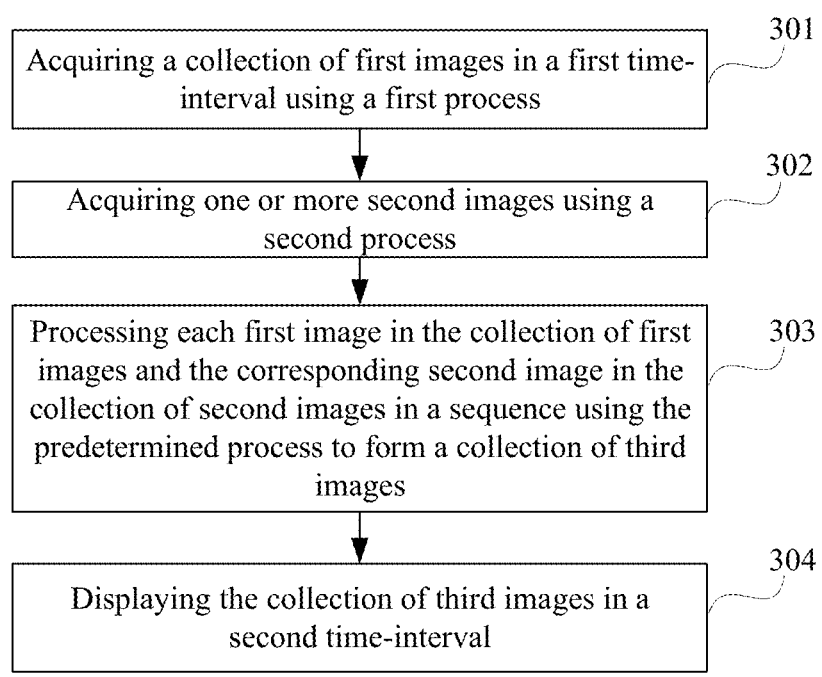
FIG. 3 illustrates another display method according to some embodiments of the present disclosure.

The present disclosure provides a display method as shown in FIG. 3. The method includes the following steps.

In 301, acquiring a collection of first images by a first time-interval using a first process, which may be the process of a plurality of acquisition devices acquiring their surroundings.

In 302, acquiring one or more second images using a second process that may be different from the first process.

In 303, processing every first image in the collection of first images and the corresponding second image in the collection of second images in a sequence using the predetermined process to form a collection of third images. The acquisition frame rate of the acquisition devices may be the same or different from the acquisition frame rate of the second images. For example, the acquisition frame rate of the acquisition devices may be 60 frames per second, the acquisition frame rate of the second images may be 30 frames per second or 100 frames per second. Therefore, when processing the first images and the second images, a first image may be selected from the collection of first images, a second image may be selected from the collection of second images, and the selected first and second images may be processed to form a third image, then proceed to the subsequent process.

It should be apparent that multiple frames of first images in the collection of first images may correspond to the same frame of second image in the collection of second images. Further, a frame of first image in the collection of first images may correspond to multiple frames of second images. Furthermore, the second images in the collection of second images may have a 1-to-1 corresponding relationship with the first images in the collection of first images.

The selection of the images may be based on the shorter intervals to select the corresponding images in the other collection, where different baseline images corresponding to the same images in the other collection. Further, selection of the images may be based on the longer intervals to select the corresponding images in the other collection, where some images in the other collection may be skipped. Further, if the intervals are the same, then the selection may have a 1-to-1 correspondence.

In one embodiment, the predetermined process may include identifying a plurality of overlapping areas between the first images and the second images, and the display priority relationships of the overlapping areas.

In 304, displaying the collection of third images in a second time-interval, where the third images may include a first area, the first area may be a portion of the overlapping areas, and the first area may display a portion of the first images.

The display method provided in the present disclosure may form the third images by overlapping the images acquired from the first process and the second process. A portion of the first images acquired by the acquisition devices of their surroundings may be the portion of images that may block the images acquired by the second process, such as blocking a portion of the images of the virtual world, so the second images may truly integrate into the real world images to provide a realistic sensation and enhance user experience.

In the disclosed display method of the present disclosure, the third images may include a second area in addition to the first area. More specifically, the first area may be a portion of the overlapping areas between the first images and the second images. The first area may display a portion of the first images, and the second area may display a portion of the second images.

Figure 4A:
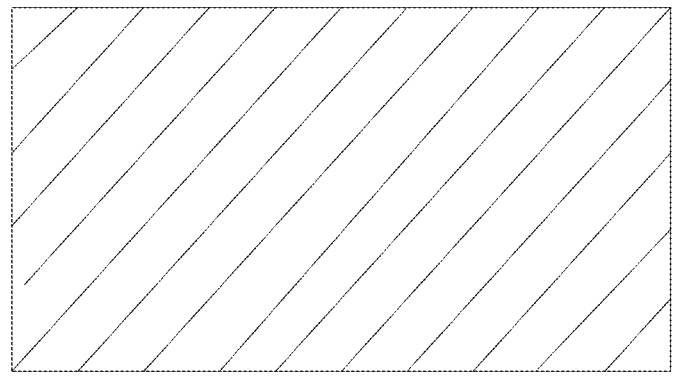
FIG. 4a illustrates a first image in a display method according to some embodiments of the present disclosure.
Figure 4B:
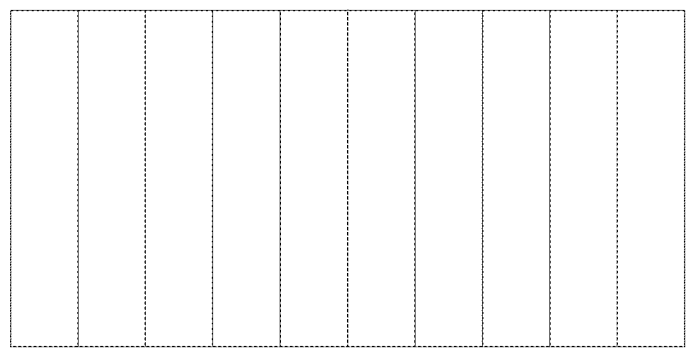
FIG. 4b illustrates a second image in a display method according to some embodiments of the present disclosure.
Figure 4C:
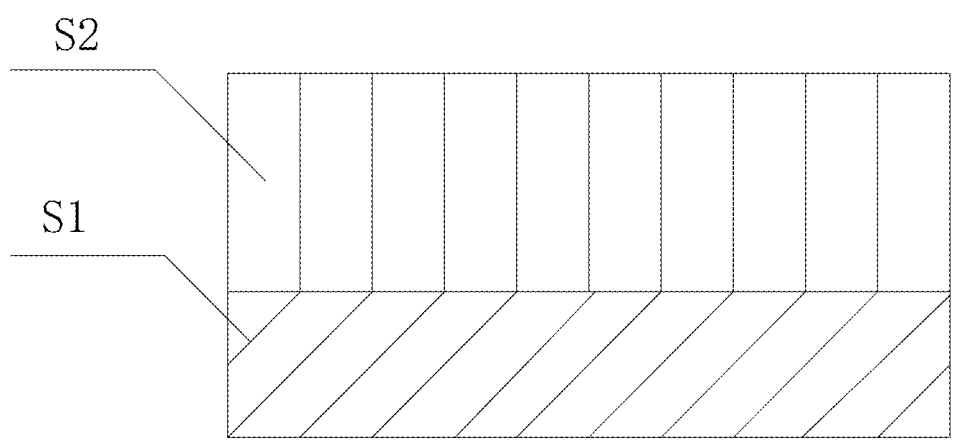
FIG. 4c illustrates a third image in a display method according to some embodiments of the present disclosure.

As shown in FIG. 4a-4c, FIG. 4a illustrates a first image, FIG. 4b illustrates a second image, and FIG. 4c illustrates a third image, where the third image may include a first area S1 and a second area S2. The first area S1 may include a portion of the overlapping area, and displays a portion of the first image; the second area S2 may display a portion of the second images.

In one embodiment, the first image and the second image may be images of the same or different sizes. If the images are of different sizes, the two images may be processed to identify the overlapping areas and display priorities; or the images may be converted to the same size, then processed to identify the overlapping areas and display priorities of the two images.

In the overlapping areas, images with higher display priority may be displayed and images with lower display priority may be blocked. For example, the first area may be a portion of the overlapping areas that displays a portion of the first image, hence, the display priority of the first image in the first area may be higher than the display priority of the second image.

In the present disclosure, the second area in the third images may display a portion of the second images. This process will be explained in the following embodiments.

The present disclosure provides a fourth embodiment to describe the first area and the second area in the third images. More specifically, the second area may be a portion of the overlapping areas between the first images and the second images that may be different from the portion of the overlapping areas in first area. That is, the overlapping areas of the first images and the second images may include a first area and a second area. The first area and the second area may be different area in the overlapping areas, where the first area may display a portion of the first images, and the second area may display a portion of the second images.

In one embodiment, in the first area, the display priority of the first images may be higher than the display priority of the second images, so a portion of each first image may be displayed in the first area; in the second area, the display priority of the second images may be higher than the display priority of the first images, so the second area may display a portion of the second images.

In other words, different portions of a first image may have different display priorities, and different portions of a second image may have different display priorities as well. In the overlapping areas between the first images and the second images, the portion of the first images corresponding to the first area may have a higher display priority than the portion of second images corresponding to the first area, so the first image in the first area may block the second images in the first area. Further, in the overlapping areas between the first images and the second images, the portion of the second images corresponding to the second area may have a higher display priority than the portion of second images corresponding to the first area, so the second images in the second area may block the first images in the second area.

In another embodiment, in the first area and the second area, the display priority of the first images may be consistently higher than the display priority of the second images. Since the display priority of the first images is consistently higher than the second images in the first area and the second area of the overlapping areas, under a typical circumstance, the first area and the second will both display a portion of the first images, however, in the present embodiment, different portions of the first images may have different transparencies.

More specifically, the first images in the first area may have a transparency in a first threshold range, so the first area may display a portion of the first images. That is, when the first images with transparency in the first threshold range overlay the second images, the second images may not be seen through the first image, so the first area may display a portion of the first image. Under this circumstance, the default transparency of the first images may be used, that is, the default transparency of the first images does not need to be changed and the transparency will stay in the first threshold range.

Further, the first images in the second area may have a transparency in a second threshold range, so the second area may display a portion of the second images. That is, when the first images with transparency in the second threshold range overlay the second images, the second images may be seen through the first image, so the second area may display a portion of the second images.

The present disclosure provides a fifth embodiment to describe the first area and the second area in the third images. More specifically, a third image may include a first area and a second area, where the first area may be a portion of the overlapping areas and may display a portion of the first image. The second area may display a portion of the second image, and the second area may be a non-overlapping area.

In the present embodiment, the third images may only include a portion of the first images that may be all displayed in the first area. Further, the portion of the first images in the third images may have a higher display priority than the second images, so in the first area, the first images may block the second images. That is, when processing the first images and the second images using the predetermined process, the first images may be cropped, only a portion of the first images may be retained, and the portion of the first images may be all located in the first area of the overlapping areas. Furthermore, the display priority of the portion of the first images may be higher than the display priority of the second images.

Figure 5A:
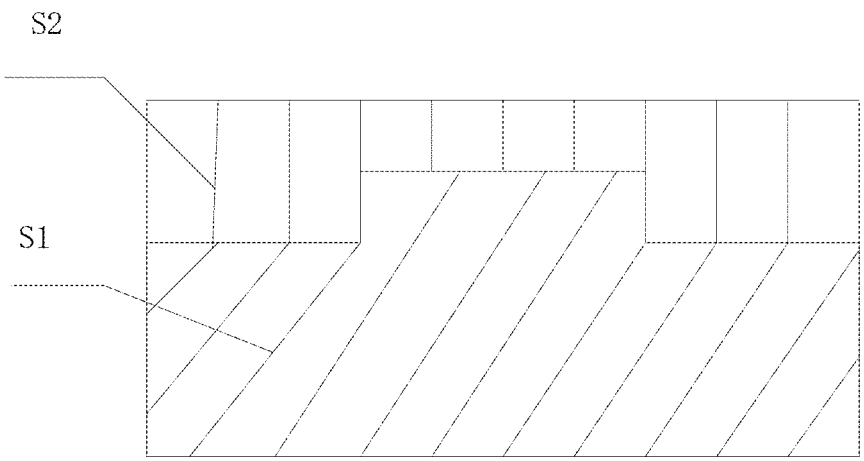
FIG. 5a illustrates another third image in a display method according to some embodiments of the present disclosure.
Figure 5B:
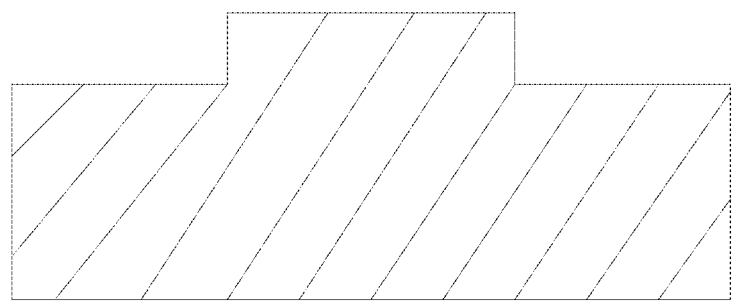
FIG. 5b illustrates a portion of a first image of a display method according to some embodiments of the present disclosure.
Figure 5C:
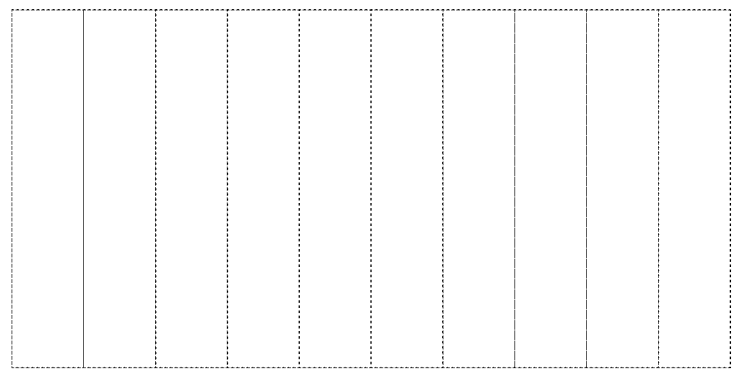
FIG. 5c illustrates another second image of a display method according to some embodiments of the present disclosure.

FIG. 5a illustrates a third image, where the third image may include a first area S1 and a second area S2. A portion of the first image may be completely displayed in the first area S1, a second image may be displayed in the second area S2, and the third image may be divided into a portion of the first image as shown in FIG. 5b and a second image as shown in FIG. 5c. The first image shown in FIG. 5b is a portion of the first image after cropping. For the uncropped first image, please refer to FIG. 4a. It can be seen that the remainder of the first image may be all displayed in the first area, and the second area may be in the non-overlapping area, and a portion of the second image may be displayed.

The present disclosure provides a sixth embodiment to further describe the third image described in the third embodiment. More specifically, the third image may include a first area and a second area, and the first area and the second area are different parts of the overlapping area.

In one embodiment, a portion of the first images displayed in the first area of the third images may be used to indicate an identifiable object. More specifically, when processing the first images and the second images using the predetermined process, the identifiable object in the first images may be identified first to identify the portion of first image with the identifiable object.

In the case where the first area and the second area in the overlapping area have different display priorities, when overlaying the first images and the second images, the portion of the first image with the identifiable object in the overlapping areas may have a higher display priority than the corresponding portion of the second image, that is, the portion of the first image with the identifiable object may block the corresponding portion of the second image. The portion of the first image without the identifiable object in the overlapping area may have lower display priority than the corresponding portion of the second image, that is, the portion of the first image without the identifiable object may be blocked by the corresponding portion of the second image, so the first area may display a portion of the first image, and the second area may display a portion of the second image.

In the case where a first image has different transparencies, when overlaying the first images and the second images, the display priority of the first image may be consistently higher than the display priority of the second image, so the first image may block the second image. However, in the overlapping area, the transparency of the portion of the first image with the identifiable object may be in the first threshold range, the transparency of the portion of the first image without the identifiable object may be in the second threshold range, so the first area may display the first image, and the second area may display the second image.

The process for identifying the identifiable object in the first image is not limited, for example, an object identification database may be created and used to process the first image and identify the object in the object identification database in the first image. Or the identifiable object in the first image may have a special tag, and the identifiable object may be identified based on the special tag, such as a special border tag.

In one embodiment, a portion of the first image not displayed in the second area may have a predetermined attribute tag, and the predetermined attribute tag may be a color parameter tag. For example, a portion of the first image may have a special color (green or blue), and the portion of the first image with the special color may be identified based on the color parameter tag.

In the case where the first area and the second area in the overlapping area have different display priorities, when overlaying the first image and the second image, the display priority of the first image may be consistently higher than the display priority of the second image, so the first image may block the second image. However, in the overlapping area, the transparency of the portion of the first image without the predetermined attribute tag may be in the first threshold range, the transparency of the portion of the first image with the predetermined attribute tag may be in the second threshold range, so the first area may display the first image, and the second area may display the second image.

In the case where a first image has different transparencies, when overlaying the first image and the second image, the display priority of the first image may be consistently higher than the display priority of the second image, so the first image may block the second image. However, in the overlapping area, the transparency of the portion of the first image without the predetermined attribute tag may be in the first threshold range, the transparency of the portion of the first image with the predetermined attribute tag may be in the second threshold range, so the first area may display the first image, and the second area may display the second image.

It should be noted that, in the sixth embodiment, the first image and the second image in the third image may be complete images, and only different display priorities or different transparencies are set for different parts of the first image.

The present disclosure provides a seventh embodiment to further describe the third image described in the fifth embodiment. More specifically, a third image may include a first area and a second area, and the first area may be a part of the overlapping area and the second area may be the non-overlapping area.

In the present embodiment, the third image may only include a portion of the first image that may be all displayed in the first area. Further, the portion of the first image in the third image may have a higher display priority than the second image.

In one embodiment, a portion of the first image displayed in the first area may be used to indicate an identifiable object. More specifically, when processing the first image and the second image using the predetermined process, the identifiable object in the first image may be identified first to identify the portion of first image with the identifiable object. The portion of the first image without the identifiable object may be removed, so only the portion with the identifiable object may be retained. When overlaying the portion of the first image with the identifiable object with the second image, the portion of the first image with the identifiable object may have a higher display priority than the corresponding portion of the second image, corresponding to the first area. That is, in the first area, the portion of the first image with the identifiable object may block the corresponding area of the second image. The second area may be a non-overlapping area, so the block relationship does not exist, and a portion of the second image may be displayed.

The process for identifying the identifiable object in the first image is not limited, for example, an object identification database may be created and used to process the first image, and identify the object in the object identification database in the first image. Or the identifiable object in the first image may have a special tag, and the identifiable object may be identified based on the special tag, such as a special border tag.

In one embodiment, a portion of the first image may be the remainder portion of the first image after removing the portion with a predetermined attribute tag. The predetermined attribute tag may be a color parameter tag. For example, a portion of the first image may have a special color (green or blue), and the portion of the first image with the special color may be identified based on the color parameter tag.

More specifically, when processing the first image and the second image using the predetermined process, the portion of the first image with the predetermined attribute tag may be identified and removed, and the portion of the first image without the predetermined attribute tag may be retained. When overlaying the remainder portion of the first image with the second image, the remainder portion of the first image may have a higher display priority than the corresponding portion of the second image, corresponding to the first area. That is, in the first area, after removing the portion of the first image with the predetermined attribute tag, the remainder portion of the first image may block the corresponding area of the second image. The second area may be the non-overlapping area, so the block relationship does not exist, and a portion of the second image may be displayed.

It should be noted that, in the seventh embodiment, the first image in the third image may be an incomplete image, and the second image may be a complete image.

In practice, since the environment of the acquisition devices may change at any time, as disclosed herein, the position and range of the first area and the second area in the overlapping area may change, the second area may become the first area, and the first area may also become the second area.

More specifically, when the environment of the acquisition devices changes, the content of the first image may also change. In one embodiment, the image range of the identifiable object in the first image may increase, or the image range of the predetermined attribute tag in the first image may decrease, and correspondingly, the second area corresponding to the previously formed third image may become the first area in the newly formed third image.

In another embodiment, the image range of the identifiable object in the first image may reduce, or the image range of the predetermined attribute tag in the first image may increase, and correspondingly, the first area corresponding to the previously formed third image may become the second area in the newly formed third image. That is, in the process of continuously displaying a portion of the second image in the third image, change in the environment of the acquisition devices may cause the second image displayed in the third image to change. The visual effect of this process is that the user may see the object that has changed in the real world as the object is not blocked by the virtual image.

Corresponding to the display method disclosed above, the present disclosure further provides a display system. The display system will be described using the following embodiments.

Figure 6:
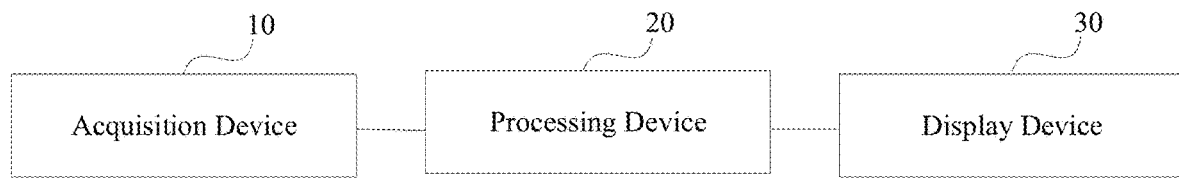
FIG. 6 illustrates a display system according to some embodiments of the present disclosure.

FIG. 6 is a schematic illustrating a display system according to some embodiments of the present disclosure. As shown in FIG. 6, the display system may include an acquisition device 10, a processing device 20, and a display device 30.

The acquisition device 10 may be used for acquiring a collection of first images of its surrounding using a first process in a first time-interval. The first time-interval may correspond to the acquisition frequency of the acquisition device. More specifically, the acquisition device may acquire a collection of first images in the first time-interval to form a video file. Since a video file may be made of multiple frames of images, the display method of the present disclosure may process the first images frame by frame, that is, each first image in the collection may be processed.

In one embodiment, the acquisition device may be a camera.

The processing device 20 may be used for acquiring one or more second images using a second process, and processing every first image in the collection of first images and the one or more second images using a predetermined process to form a collection of third images.

The second images may represent images of the virtual world, and the second process may be different from the process the acquisition device takes to acquire the first images. More specifically, the second process may be the process of constructing a plurality of second images such as downloading images from the internet, reading images from a storage location, or generating images based on calculation, etc. For example, one or more second images may be acquired from the virtual world image rendering software.

The predetermined process may include identifying a plurality of overlapping areas between the first images and the second images, and the display priority relationships of the overlapping areas.

In the present disclosure, the processing device may process every first image in the collection of first images acquired in real-time to identify a plurality of overlapping areas between the first images and the second images, and the display priority relationships of the overlapping areas. The identified overlapping areas and their respective display priority relationships, every first image and one or more second images may be processed to form a collection of third images. More specifically, the number of third images in the collection of third images may be the same as the number of first images in the collection of first images.

In one embodiment, processing device 20 may acquire the collection of second images using the second process, then use the predetermined process to process every first image in the collection of first images with corresponding relationship to each second image in the collection of second images in a sequence to form the collection of third image. Further, the second images in the collection of second images may have a 1-to-1 corresponding relationship with the first images in the collection of first images.

The display device 30 may be used for displaying the collection of the third images in a second time-interval, where the third images may include a first area, the first area may be a portion of the overlapping areas, and the first area may display a portion of the first images. That is, a portion of the overlapping areas may display a portion of the first images, in other words, a portion of the first images may block the second images in the overlapping areas.

In one embodiment, the second time-interval may correspond to the display frequency of the third images in the collection of third images. More specifically, the second time-interval may be the same or different from the first time-interval.

In one embodiment, the acquisition device 10 and the display device 30 may be integrated into a head-mounted device. The head-mounted device may further include a wearing device for maintaining the relative positions of the head-mounted device and the wearer's head. For example, the wearing device may be a helmet shell, a spectacle frame, etc. The acquisition device 10 may be used to acquire the surrounding of the acquisition device that may be within the user's viewing field. For example, acquisition device 10 may be place on a head-mounted device near a user's eyes, so the acquisition range of the acquisition device 10 may match the user's viewing field, and a collection of the first images of the surrounding of the acquisition device 10 within the user's viewing field may be collected.

In one embodiment, in order to allow the user to see the three-dimensional display effect, the display device may include two or more acquisition devices to acquire the collection of first images separately in real-time based on the first time-interval. The processing device may process each first image acquired by different acquisition devices in the collection of first images with one or more second images to form the collection of third images. Correspondingly, the display position of the collection of third images formed based on the collection of first images acquired by each acquisition device may correspond to the position of the acquisition devices.

The embodiments the present disclosure may be used to form the third images by overlaying the images acquired from the first process and the second process. A portion of the first images acquired by the acquisition devices of their surroundings may be the portion of images that may block the images acquired by the second process, such as blocking a portion of the images of the virtual world, so the second images may truly integrate into the real world images to provide a realistic sensation and enhance user experience.

Figure 7:
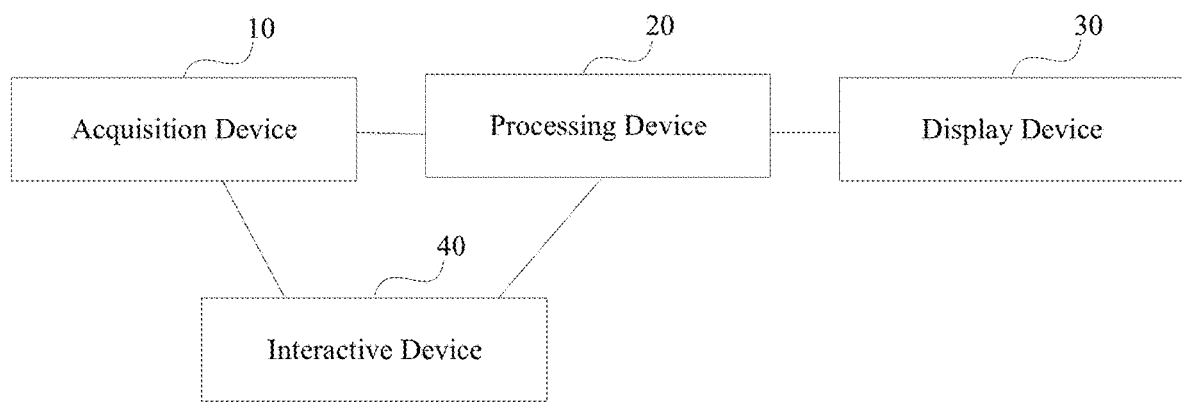
FIG. 7 illustrates another display system according to some embodiments of the present disclosure.

FIG. 7 is a schematic illustrating a display system according to some embodiments of the present disclosure. As shown in FIG. 7, the display system may include an acquisition device 10, a processing device 20, a display device 30, and an interactive device 40.

The acquisition device 10 may be used for acquiring a collection of first images of its surrounding using a first process in a first time-interval.

The processing device 20 may be used for acquiring one or more second images using a second process, and processing every first image in the collection of first images and the one or more second images using a predetermined process to form a collection of third images, where the second process may be different from the first process.

The predetermined process may include identifying a plurality of overlapping areas between the first images and the second images, and the display priority relationships of the overlapping areas.

The display device 30 may be used for displaying the collection of the third images in a second time-interval, where the third images may include a first area, the first area may be a portion of the overlapping areas, and the first area may display a portion of the first images.

The interactive device 40 may be partially located in the acquisition range of the acquisition device 10, so the first images acquired by the acquisition device 10 may have a portion of the image from the interactive device 40.

The interactive device 40 may be used for providing input data to the processing device 30 to identify one or more second images based on the input data. The input data may be data inputted by the user.

In one embodiment, the interactive device 40 may further include a status sensor, such as a 6-axis gyroscope. The sensor data collected by the status sensor may also be provided to the processing device 30, such that the processing device 30 may identify one or more second images based on the input data and the sensor data.

It should be noted that a part of the interaction device 40 in the first image may be an identifiable object, so that the first area may display a portion of the first image with the identifiable object.

Figure 8:
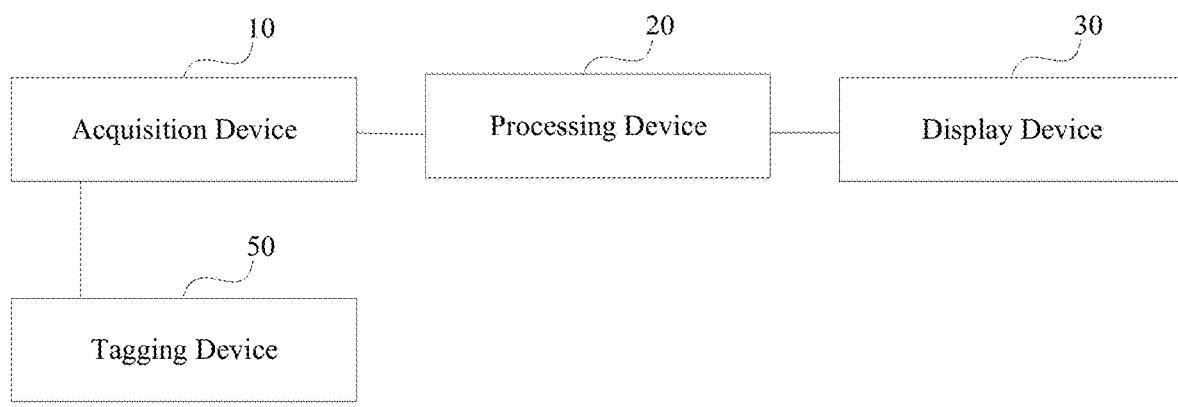
FIG. 8 illustrates another display system according to some embodiments of the present disclosure.

FIG. 8 is a schematic illustrating a display system according to some embodiments of the present disclosure. As shown in FIG. 8, the display system may include an acquisition device 10, a processing device 20, a display device 30, and a tagging device 50.

The acquisition device 10 may be used for acquiring a collection of first images of its surrounding using a first process in a first time-interval.

The processing device 20 may be used for acquiring one or more second images using a second process, and processing every first image in the collection of first images and the one or more second images using a predetermined process to form a collection of third images, where the second process may be different from the first process.

The predetermined process may include identifying a plurality of overlapping areas between the first images and the second images, and the display priority relationships of the overlapping areas.

The display device 30 may be used for displaying the collection of the third images in a second time-interval, where the third images may include a first area, the first area may be a portion of the overlapping areas, and the first area may display a portion of the first images.

The tagging device 50 may be partially located in the acquisition range of the acquisition device 10, so the first images acquired by the acquisition device 10 may have a predetermined attribute tag. That is, the tagging device 50 may tag a portion of the first images acquired by the acquisition device 10. For example, the tagging device 50 may be a green screen or a blue screen to provide a color tag to a portion of the first images.

It should be noted that the display system provided in the present disclosure may include both interactive device and the tagging device. The tagging device may be disposed on the interactive device, or may be disposed separately.

The following embodiments will be used to describe the third images of the display system provided in the present disclosure.

In one embodiment, the third images may include a second area to display a portion of the second images.

In one embodiment, the second area may be a portion of the overlapping areas between the first images and the second images that may be different from the portion of the overlapping areas in first area.

More specifically, in one embodiment, in the first area, the display priority of the first images may be higher than the display priority of the second images, so a portion of each first image may be displayed in the first area; in the second area, the display priority of the second images may be higher than the display priority of the first images, so the second area may display a portion of the second images.

In another embodiment, in the first area and the second area, the display priority of the first images may be consistently higher than the display priority of the second images; the first images in the first area may have a transparency in a first threshold range, so the first area may display a portion of the first images; and the first images in the second area may have a transparency in a second threshold range, so the second area may display a portion of the second images.

In one embodiment, a portion of the first images displayed in the first area may be used to indicate an identifiable object; or, a portion of the undisplayed first image may include the identifiable object.

In another embodiment, the third images may only include a portion of the first images that may be all displayed in the first area, and the second area may be the non-overlapping area. More specifically, the portion of the first images displayed in the first area may be used to indicate an identifiable object; or the portion of the first images may be the remainder of the first images after removing the portion of images with the predetermined attribute tag.

It should be noted that the specific implementation of the third images of the display system provided in the present disclosure may be referred to the above-described embodiments, and will not be discussed hereinafter.

Figure 9A:
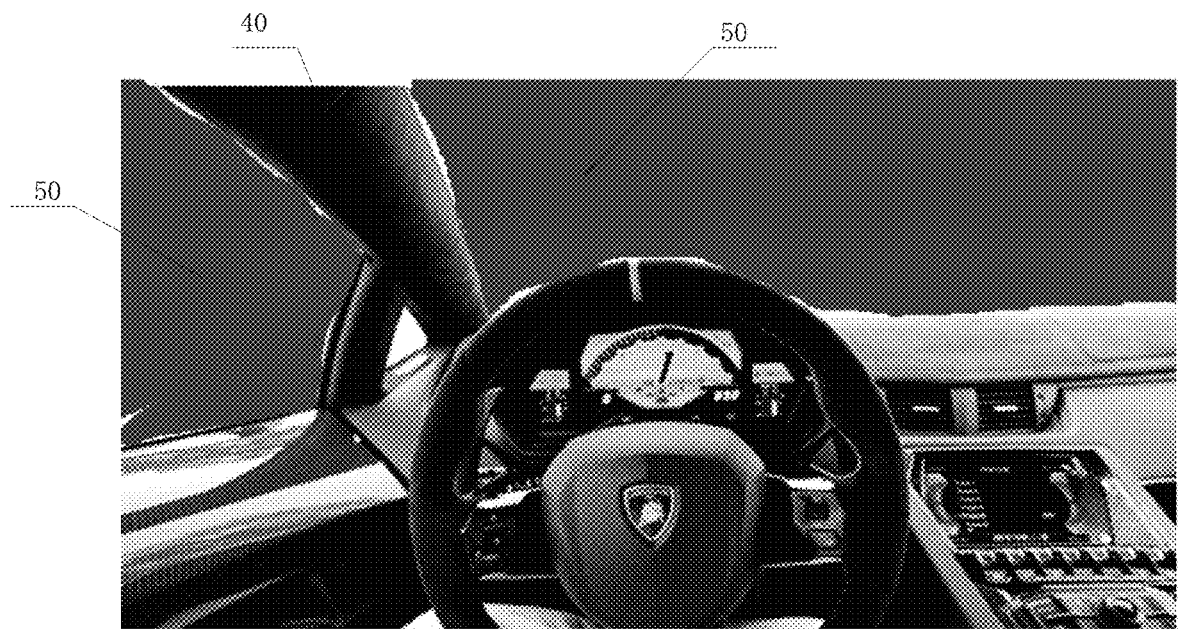
FIG. 9a illustrates a first image according to some embodiments of the present disclosure.
Figure 9B:
FIG. 9c illustrates a third image according to some embodiments of the present disclosure.
Figure 9C:

FIGS. 9a-9c illustrate a third image according to some embodiments of the present disclosure. As shown in FIGS. 9a-9c, FIG. 9a illustrates a first image, FIG. 9b illustrates a second image, and FIG. 9c illustrates a third image. In the first image shown in FIG. 9a, 40 may correspond to a partial image of an interactive device 40, and 50 may correspond to a non-interactive device 50, such as a partial image of a tagging device. Hence, in the third image, the first area may display a portion of the first image 40, the second area may correspond to the partial image of the first image 50, and display the second image.

In a scenario corresponding to FIGS. 9a-9c, the interactive device may be the accelerator (not shown in FIGS. 9a-9c) and the steering wheel, and the user may control the change in the second image using the accelerator and the steering wheel. For example, in response to turning the steering wheel, the second image may change to provide the visual effect of turning a real car.

Based on the scenario above, in another embodiment of the display system of the present disclosure, a tagging device may be disposed at the edge of the interactive device, or at the interval between the interactive devices.

Based on the scenario described above, the surroundings of the acquisition devices may be constantly changing. For example, when the user's hand is raised to the position of the window, the user's hand will appear in the acquisition device content, and will block the tagging device. That is, there will be changes in the objects between the interactive device and the acquisition device. In this case, the first image acquired by the acquisition device may change, the visual effect of the newly formed objects in the corresponding collection of the third images may block the second image, so the third image may change in response to the changes in the acquisition device's surroundings.

In the scenario described above, when there is a certain distance between the tagging device and the interactive device, then the changes in the surroundings of the acquisition device may cause changes in the first image acquired by the acquisition device. For example, when a person walks by between the tagging device and the interactive device and it within the acquisition range of the acquisition device. In this case, the object in the tagging device and the interactive device may change, the visual effect of the newly formed objects in the corresponding collection of the third images may block the second image, so the third image may change in response to the changes in the acquisition device's surroundings.

Corresponding to the scenario described above, the present disclosure provides another embodiment of the display system, where the position and range of the first area and the second area in the overlapping area may change, the second area may become the first area, and the first area may also become the second area.

More specifically, when the environment of the acquisition devices changes, the content of the first image may also change. In one embodiment, the image range of the identifiable object in the first image may increase, or the image range of the predetermined attribute tag in the first image may decrease, and correspondingly, the second area corresponding to the previously formed third image may become the first area in the newly formed third image.

In another embodiment, the image range of the identifiable object in the first image may reduce, or the image range of the predetermined attribute tag in the first image may increase, and correspondingly, the first area corresponding to the previously formed third image may become the second area in the newly formed third image. That is, in the process of continuously displaying a portion of the second image in the third image, change in the environment of the acquisition devices may cause the second image displayed in the third image to change. The visual effect of this process is that the user may see the object that has changed in the real world as the object is not blocked by the virtual image.

The embodiments of the present disclosure provide a display method. The method includes acquiring a collection of first images in a first time-interval using a first process for a plurality of acquisition devices to acquire their surroundings; acquiring one or more second images using a second process; processing every first image in the collection of first images and the one or more second images using a predetermined process to form a collection of third images; and displaying the collection of third images in a second time-interval. Further, the predetermined process may include identifying a plurality of overlapping areas between the first images and the second images, and the display priority relationships of the overlapping areas. Furthermore, the third images may include a first area, the first area may be a portion of the overlapping areas, and the first area may display a portion of the first images. The display method provided in the present disclosure may form the third images by overlaying the images acquired from the first process and the second process. A portion of the first images acquired by the acquisition devices of their surroundings may be the portion of images that may block the images acquired by the second process, such as blocking a portion of the images of the virtual world, so the second images may truly integrate into the real world images to provide a realistic sensation and enhance user experience.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

Persons skilled in the art may further realize that, units and steps of algorithms according to the description of the embodiments disclosed by the present disclosure can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present disclosure.

The steps of the methods or algorithms described in the embodiments of the present disclosure may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of an computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A display method, comprising:
    acquiring a collection of first images by a first time-interval using a first process; wherein the first process is performed by a plurality of acquisition devices acquiring surroundings thereof;
    acquiring one or more second images using a second process, the second process being different from the first process;
    processing, by a processing device, each first image in the collection of the first images and the one or more second images using a predetermined process to form a collection of third images, the predetermined process including: identifying a plurality of overlapping areas between the first images and the second images by the processing device, and identifying a display priority relationship among the plurality of overlapping areas by the processing device; and
    displaying the collection of the third images by a second time-interval, wherein:
        the third images include a first area, the first area is at least a portion of the overlapping areas, and the first area displays at least a portion of the first images.

2. The method according to claim 1, wherein:
    acquiring the one or more second images using the second process further includes:
    acquiring a collection of second images using the second process; and
    processing each first image in the collection of the first images and the one or more second images using the predetermined process to form the collection of the third images includes:
        processing each first image in the collection of the first images and a corresponding second image in the collection of the second images in a sequence using the predetermined process to form the collection of the third images.

3. The method according to claim 1, wherein the third images further include a second area, and the second area displays at least a portion of the second images.

4. The method according to claim 3, wherein the second area is another portion of the overlapping areas between the first images and the second images, and is different from the portion of the overlapping areas in first area.

5. The method according to claim 4, wherein:
    in the first area, the first images have a higher display priority than the second images such that at least a portion of the first images is displayed in the first area; and in the second area, the second images have a higher display priority than the first images such that at least a portion of the second images is displayed in the second area; or
    in the first area and the second area, the first images has a display priority consistently higher than the second images; the first images in the first area have a transparency within a first threshold range, such that at least a portion of the first images is displayed in the first area; and
    the first images in the second area have a transparency within a second threshold range such that at least a portion of the second images is displayed in the second area.

6. The method according to claim 5, wherein:
    the at least a portion of the first images displayed in the first area is used to indicate an identifiable object; or
    a portion of un-displayed first images in the second area includes a predetermined attribute tag.

7. The method according to claim 3, wherein:
    the third images only include a portion of the first images all displayed in the first area, and the second area is a non-overlapping area, wherein:
        the at least a portion of the first images displayed in the first area is used to indicate the identifiable object, or
        a portion of the first images is a remainder of the first images after removing the portion of images with the predetermined attribute tag.

8. A display system, comprising:
    a plurality of acquisition devices, for acquiring a collection of first images of surroundings thereof using a first process by a first time-interval;
    a processing device, for acquiring one or more second images using a second process, and processing each first image in the collection of the first images and the one or more second images using a predetermined process to form a collection of third images, the second process being different from the first process; the predetermined process including identifying a plurality of overlapping areas between the first images and the second images by the processing device, and identifying a display priority relationship among the plurality of overlapping areas by the processing device; and
    a display device, for displaying the collection of the third images by a second time-interval, wherein the third images include a first area, the first area is at least a portion of the overlapping areas, and the first area displays at least a portion of the first images.

9. The system according to claim 8, further comprising:
    an interactive device at least partially located in an acquisition range of the plurality of acquisition devices for providing input data to the processing device to identify one or more second images based on the input data; or
    a tagging device at least partially located in the acquisition range of the plurality of acquisition devices for tagging a predetermined attribute tag on the first images acquired by the plurality of acquisition devices.

10. The system according to claim 8, wherein the plurality of acquisition devices and the display device are integrated into a head-mounted device.

11. The method according to claim 3, wherein the second area is a non-overlapping area between the first images and the second images.

12. The method according to claim 4, further comprising:
    identifying an object in the first images;
    assigning an area corresponding to the identified object as the first area, wherein in the first area, the first images have a higher display priority than the second images such that a portion of the first images is displayed in the first area; and
    assigning an area without the identified object as the second area, wherein in the second area, the second images have a higher display priority than the first images such that a portion of the second images is displayed in the second area.

13. The method according to claim 12, wherein identifying the object in the first images comprises:
    processing the first images to identify the object using an object identification database.

14. The method according to claim 12, wherein identifying the object in the first images comprises:
    identifying the object in the first images based on an image tag.

* * * * *